United States Patent [19]

Tarbet et al.

[11] Patent Number: 5,084,430

[45] Date of Patent: * Jan. 28, 1992

[54] SULFUR AND NITROGEN CONTAINING HYDROCARBONS AND PROCESS OF USING SAME IN SEPARATING DESIRED IONS FROM SOLUTIONS THEREOF

[75] Inventors: Bryon J. Tarbet; Ronald L. Bruening; Jerald S. Bradshaw; Reed M. Izatt, all of Provo, Utah

[73] Assignee: Brigham Young University, Provo, Utah

[*] Notice: The portion of the term of this patent subsequent to Dec. 10, 2008 has been disclaimed.

[21] Appl. No.: 542,013

[22] Filed: Jun. 22, 1990

Related U.S. Application Data

[63] Continuation-in-part of Ser. No. 236,763, Aug. 26, 1988.

[51] Int. Cl.$^5$ .............................................. B01J 20/22
[52] U.S. Cl. ........................................ 502/401; 423/25
[58] Field of Search ............................................ 502/401

[56] References Cited

U.S. PATENT DOCUMENTS 4,767,670 8/1988 Cox et al. ..................... 502/401 X

FOREIGN PATENT DOCUMENTS 276138 7/1988 European Pat. Off. .

Primary Examiner—Patrick P. Garvin
Attorney, Agent, or Firm—Terry M. Crellin

[57] ABSTRACT

Compositions of matter are disclosed comprising nitrogen containing hydrocarbons which are modified with at least one of the elements selected from the group consisting of sulfur, phosphorus an arsenic, with the modified hydrocarbons being covalently bonded to trialkoxysilane. These modified hydrocarbons are further covalently bonded to a solid inorganic support such as silica to form a solid complexing agent. The complexing agents are particularly useful in a process of removing and/or concentrating certain ions, such as noble metal ions and other transition metal ions, from solutions thereof admixed with other ions by forming a complex of the desired ion(s) with the complexing agent. The solution preferably flow through a column packed with the complexing agent to form the complex of the desired ion(s). The desired ion(s) are recovered from the column by subsequently flowing a receiving liquid through the column, wherein the receiving liquid is adapted to break the complex and receive ion(s) in solution in the receiving liquid. The receiving ion(s) can then be separated from the receiving liquid if so desired.

6 Claims, 1 Drawing Sheet

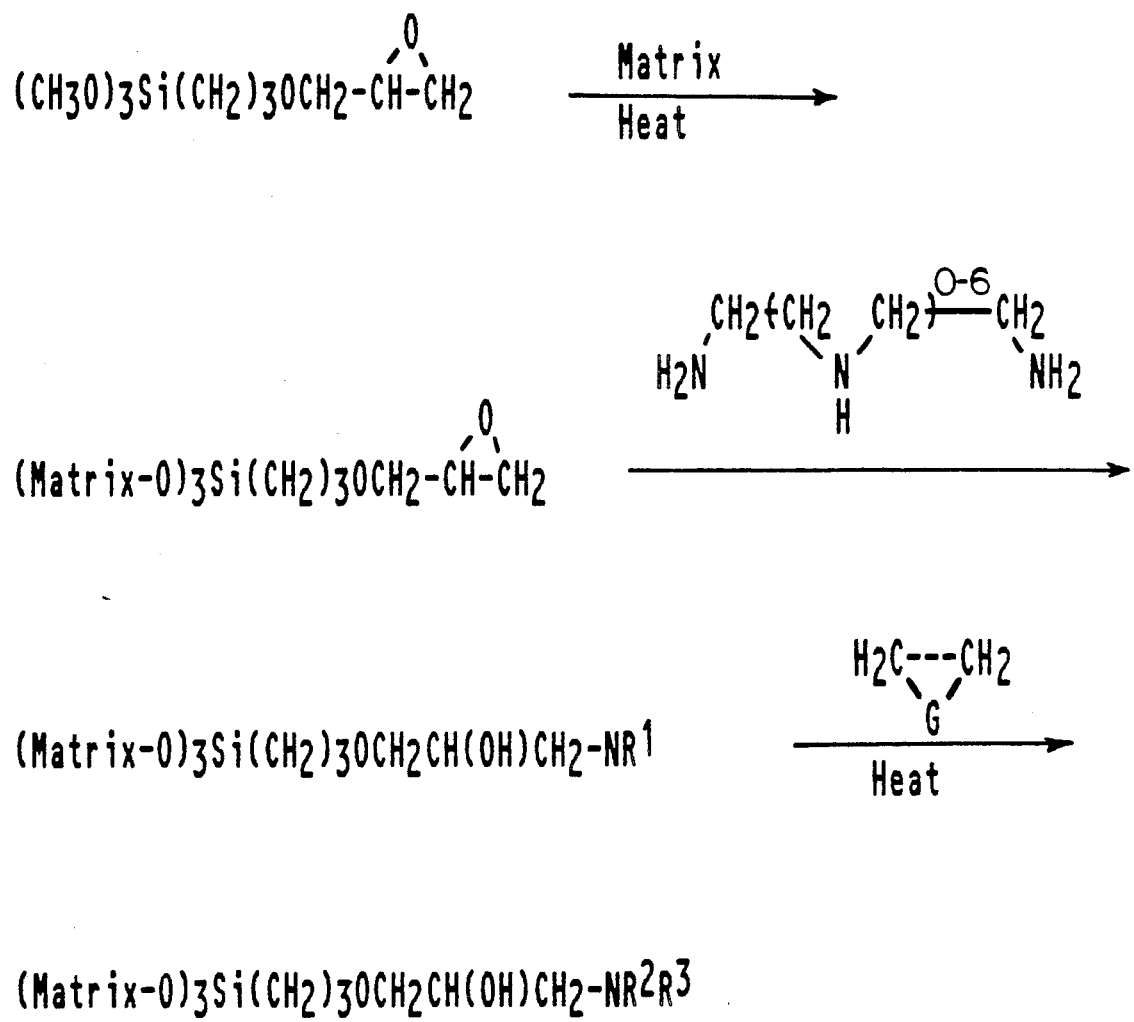

SULFUR AND NITROGEN CONTAINING HYDROCARBONS AND PROCESS OF USING SAME IN SEPARATING DESIRED IONS FROM SOLUTIONS THEREOF

INTRODUCTION

This application is a continuation-in-part of U.S. application Ser. No. 07/236.763, filed Aug. 26, 1988.

The present invention relates to novel compositions and the use of such compositions in a process of recovering and concentrating desired ions from solutions containing other ions in addition to the desired ions.

The novel compositions comprise nitrogen containing hydrocarbons that are modified with at least one of the elements selected from the group consisting of sulfur, phosphorus and arsenic. These hydrocarbons are further covalently bonded to an inorganic solid support, such as sand, silica gel, glass, glass fibers, titania, zirconia, alumina and nickel oxide. The compositions bonded to the solid suppor are particularly useful in a process for removing and concentrating desired ions, such as noble metal ions and other transition metal ions, from solutions thereof. The solutions containing the desired ions may or may not contain other ions. When the solutions contain other ions, the other ions may or may not be present in much higher concentrations than the desired ions. The process of removing and concentrating the desired ions is accomplished by forming a complex of the desired ions with a complexing agent comprising the novel compositions of this invention. The complex can be formed by contacting the solutions with the complexing agent. Advantageously, the solutions flow through a column packed with the complexing agent. Following the formation of the complex, a receiving liquid, which can be of much smaller volume than the volume of the starting solution, is brought into contact with the loaded complexing agent to remove and concentrate the desired ions in the receiving liquid. The desired ions are then recovered from the receiving liquid.

BACKGROUND OF THE INVENTION

It is known that macrocyclic polythioethers and certain other sulfur containing hydrocarbon ligands present as solutes in a solvent such as water are characterized by their ability to selectivity form strong bonds with the noble metal, platinum group metal, and mercury ions or groups of these ions present as solutes in the same solvent. In an article by R. M. Izatt, R. E. Terry, L. K. Hansen, A. G. Avondet, J. S. Bradshaw, K. K. Dalley, T. E. Jensen and J. J. Christensen, A CALORIMETRIC TITRATION STUDY OF UNI- AND BIVALENT METAL ION INTERACTION WITH SEVERAL THIA DERIVATIVES OF 9-CROWN-13, 12-CROWN-4, 15-CROWN-5, 18-CROWN-6, 24-CROWN-8, AND SEVERAL OXA-THIAPENTADECANES IN WATER OR WATER-METHANOL SOLVENTS AT 25° C., Inorganica Chimica Acta, 1978, Vol. 20, 1-8, the complexation of silver and mercury ions by open chain sulfur containing hydrocarbons is disclosed. In another article by S. R. Cooper, CROWN THIOETHER CHEMISTRY, Accounts of Chemical Research, 1988, Vol. 21, 141-146, the complexation of rhodium and silver ions by macrocyclic sulfur containing ligands is disclosed. However, researchers have not previously been able to incorporate nitrogen containing hydrocarbon ligands modified with sulfur, phosphorus and arsenic into separation systems where the behavior of the modified ligands in the separation systems is unchanged in comparison to the ligand as a solute and/or the modified ligand will remain in the separation system. Articles such as those entitled SILANE COMPOUNDS FOR SILYLATING SURFACES by E. P. Plueddeman, in "Silanes, Surfaces and Interfaces Symposium, Snowmass, 1985," Ed. by D. E. Leyden, Gordon and Breach, Publishers, 1986, pp. 1-25, and SILANE COUPLING AGENTS by E. P. Plueddemann, Plenum Press, 1982, pp. 1-235, list many different types of organic materials which have been attached to silane compounds and discusses some of their properties. The preparation and uses of nitrogen containing hydrocarbons that have been modified with sulfur, phosphorus and arsenic and which are attached to silane or silica have not been disclosed in the prior art, including the above mentioned articles or in any existing patents of which we are aware. The unique complexing properties of the modified nitrogen containing hydrocarbons disclosed herein and the ability to attach these modified nitrogen containing hydrocarbons to an inorganic solid support without reducing their ability to complex selected metal ions are significant accomplishments of the present invention.

SUMMARY OF THE INVENTION

The novel compositions of the present invention comprise certain sulfur and nitrogen containing hydrocarbon ligands covalently bonded to an inorganic solid support, e.g., sand, silica gel, glass, glass fibers, titania, zirconia, alumina or nickel oxide. The compounds are shown by the structural formula (1).

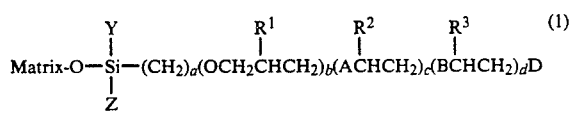

In formula (1), A and B are members independently selected from the group consisting of $N(R)$, $N(R)CH_2$, $O$, $OCH_2$, $S$ and $SCH_2$, with the proviso that if A is selected from the group consisting of $O$, $OCH_2$, $S$ and $SCH_2$, then B must be selected from the group consisting of $N(R)$ and $N(R)CH_2$; D is a member selected from the group consisting of H, $NH(R)$, $SH$, $OH$, lower alkyl and $N(R)[CH_2CH(R^1)CH_2O]_b(CH_2)_aSiXYZ$; X, Y and Z are members independently selected from the group consisting of Cl, O-matrix, $OCH_3$, $OC_2H_5$, methyl, ethyl and halogenated substituents thereof; R is a member selected from the group consisting of H, lower alkyl, aryl and $[(CH_2)_fE]_gR^4$; $R^1$, $R^2$ and $R^3$ are members independently selected from the group consisting of H, SH, OH, lower alkyl, $[(CH_2)_fE]_gR^4$, dialkylphosphino, diarylphosphino, dialkylarsino, diarylarsino and aryl, such as phenyl, naphthyl and pyridyl; E is selected from the group consisting of S, Se and Te; $R^4$ is a member selected from the group consisting of hydrogen, lower alkyl and aryl; a is an integer from 2 to about 10; b is an integer of 0 or 1; c is an integer from 1 to about 2000; d is an integer from 0 to about 2000; f is an integer from 2 to about 10; g is an integer from 1 to about 20; and matrix is selected from the group consisting of sand, silica gel, glass, glass fibers, alumina, zirconia, titania and nickel oxide. Two further provisos must be met in the compounds of formula (1). First, at least one of the groups R, $R^1$, $R^2$ and $R^3$ must be present in the compound as a member independently selected from the group consisting of SH, dialkylphosphino, diarylphosphino, dialkylarsino, diarylarsino and $[(CH_2)_fE]_gR^4$. Second, d can be the integer 0 only if A is selected from the group consisting of N(R) and N(R)CH$_2$.

The compositions of formula (1) are characterized by high selectivity for and removal of desired metal ions or groups of metal ions such as the noble metal ions present at low concentrations from a source phase containing a mixture of the desirable metal ions and other undesirable ions which are often in much greater concentrations in the solution than the desirable ions. The compounds of formula (1) have the ability to quantitatively complex desired ion(s) from a large volume of solution in which the desired ion(s) are present at low concentrations. Thus, the compositions of formula (1) are ideally suited to be used in a novel process of selectively and quantitatively removing and concentrating a selected ion or group of ions present at low concentrations from a plurality of other ions in a multiple ion solution in which the other ions may be present at much higher concentrations. The ions to be recovered and/or concentrated can be noble metal type, e.g., gold, silver and the platinum metals, e.g., platinum, palladium, rhodium and iridium. When noble metals are not present, ions of mercury, lead, zinc, and other transition metals can be recovered and/or concentrated. The process of recovering and/or concentrating the selected ions comprises bringing the multiple ion solution into contact with a compound of formula (1) to complex the desired ion(s) with the compound, breaking the complex with a receiving liquid to render the ion(s) soluble in the receiving solution and then recovering the ion(s) from the receiving solution.

The preferred embodiment disclosed herein involves carrying out the process by bringing a large volume of the multiple ion solution into contact with a compound of formula (1) in a separation column. The multiple ion solution flows through the column and the desired ion or ions form a complex with the compound of formula (1). A smaller volume of a receiving liquid such as aqueous NH$_3$, for example, is then passed through the column to break the complex by chemical or thermal means. The receiving liquid further dissolves the desired ions and carries them out of the column. Instead of using a column, the compound of formula (1) may be slurried in a suitable liquid, e.g., water. The multiple ion mixture can be present in the slurring liquid or subsequently added to the slurry. The desired ions(s) complex with the compound of formula (1) in the slurry and the slurry is then filtered. The resulting solids are washed with a receiving liquid to break the complex and recover the desired ion(s) in the receiving liquid. The desired metal ions are recovered from the receiving liquid by well known procedures.

In a particularly preferred embodiment of the process a covalent chemical bond is formed between an inorganic solid support, preferably, sand or silica gel, and at least one of the compounds of formula 1. The resulting bonded silica compound of formula is placed in a contacting device such as a tall column. The multiple ion mixture is passed through the column, with the desired metal ions from the multiple ion mixture forming a complex with the bonded silica to separate the desired metal ions from the rest of the mixture which flows out of the column. A small volume of the receiving liquid is thereafter passed through the column to break the complex as well and as to dissolve and carry out of the column the desired metal ions. The desired metal ions are then recovered from the receiving liquid by well known procedures.

BRIEF DESCRIPTION OF THE DRAWING

The drawing shows schematically a reaction sequence illustrating a preferred method for producing hydrocarbon compositions of the present invention which are covalently bonded to an inorganic solid support or matrix.

DESCRIPTION OF THE PREFERRED EMBODIMENTS OF THE INVENTION

The new compositions of the invention are represented by formula (1) as given above. These compositions consist of certain sulfur and nitrogen containing hydrocarbon ligands which are covalently bonded to an inorganic solid support in accordance with the invention.

In producing the novel compositions of formula (1), a glycidoxyalkyltrialkoxysilane is covalently bonded to any inorganic solid support which has surface hydroxylic groups capable of reacting with the alkoxy silane portion of the reactant as shown in the first step of the reaction sequence shown in the drawing. The reaction can take place by first, dissolving the starting silane compound in a low boiling solvent such as dichloromethane, adding the solid support, removing the low boiling solvent, then heating the coated support at about 120° C. for 3 to about 18 hours under vacuum. A second procedure for bonding the alkoxysilane portion of the reactant with the solid support is to heat the solid support with the reactant in a high boiling solvent such as toluene. In a subsequent step or steps ethylenediamine is reacted with the epoxide function, and the intermediate is further reacted with ethylene sulfide to give a material containing both sulfur and nitrogen, such as (CH$_3$O)$_3$Si(CH$_2$)$_3$OCH$_2$CH(OH)CH$_2$NRCH$_2$CH$_2$NRH, where R is a repeating ethylenethio group.

The following three examples are given to illustrate compounds which have been made in accordance with formula 1 of the present invention. These examples are illustrative only and are not comprehensive of the many different compounds which have or can be made within the scope of the present invention.

EXAMPLE 1

Silica gel (30 g, 60-22 mesh) was slowly added to 375 mL of toluene and 7.5 g of γ-glycidoxypropyltrimethoxysilane. The mixture was maintained in suspension by mechanical stirring and was heated at reflux overnight. Ethylenediamine (1.25 g) was then added to the suspension and heated an additional 5 hours. The mixture was allowed to cool and 5.2 g of ethylene sulfide was added. The suspension was stirred at room temperature for 6 hours and then heated to 80° C. overnight to effect reaction. The product was isolated by filtration and allowed to air dry.

EXAMPLE 2

Silica gel was covalently attached to γ-glycidoxypropyltrimethoxysilane in the same manner as given in Example 1. This intermediate was then reacted with pentaethylenehexamine and ethylene sulfide successively as in Example 1 in a mole ratio of 3 to 1 such that there are three ethylenethio groups per nitrogen.

EXAMPLE 3

Silica gel was covalently attached to γ-glycidoxypropyltrimethoxysilane in the same manner as given in Example 1. This intermediate was then reacted with pentaethylenehexamine, and 5 g of the resulting nitrogen containing intermediate was suspended in toluene at −40° C. in a flask equipped with a mechanical stirrer and a dropping funnel. Into the dropping funnel was placed 2.5 g of chlorodiphenylphosphine. The phosphine was added slowly to the flask and the mixture was allowed to come to room temperature. The amount of phosphine added to the flask was sufficient to put one phosphorus group on each nitrogen atom of the nitrogen containing intermediate. The final product was isolated by filtration and washed extensively with methanol and a solution of sodium bicarbonate in water to remove any trace of acid from the synthesis.

METAL ION RECOVERY AND CONCENTRATION PROCESS

The metal ion recovery and concentration process of the invention relates to the selective recovery of desired metal ions from mixtures thereof with other metal ions using the compounds of formula 1 of the invention as defined above. Effective methods of recovery and/or separation of metal ions, particularly the noble metal ions, from other metal ions in water supplies, waste solutions, deposits and industrial solutions and silver recovery from waste solutions, e.g., from emulsions on photographic and X-ray film, represent a real need in modern technology. These ions are typically present at low concentrations in solutions containing other ions in much greater concentration. Hence, there is a real need for a process to selectively recover and concentrate these metal ions. The present invention accomplishes this separation effectively and efficiently by the use of compounds selected from the families represented by formula (1).

The material of formula (1) is preferably placed in a column. An aqueous solution containing the desired ion(s), in a mixture of other ions, which may be in much greater concentration, is passed through the column. The flow rate may be controlled by applying pressure to the top of the column or by applying vacuum to the receiving vessel at the bottom of the column. After the solution has passed through the column, a volume of a recovery solution, i.e. aqueous sodium thiosulfate, aqueous ammonia, or aqueous sodium cyanide, which forms a stronger complex with the desired noble metal ions, or in their absence other metal ions, as stated above, is passed through the column. This recovery solution contains only the desired metal ions in a more concentrated form.

The following examples of separations of metal ions by the sulfur and nitrogen containing materials of Examples 1, 2 and 3 are given as illustrations. These examples are illustrative only and are not comprehensive of the many separations of noble metal, platinum group metal, and in some cases transition metal ions that are possible using the materials made within the scope of this invention.

EXAMPLE 4

In this example, 4 g of the sulfur and nitrogen containing hydrocarbon of Example 1 was placed in a column. A 500 mL solution of approximately 10 ppm (parts per million) copper ion in 1M HCl was drawn through the column using a vacuum pump at 600 torr to increase the flow rate. A 25 mL aqueous solution of 2M $NH_3$, 1M HCl was then passed through the column. Analysis of the recovery solution by atomic absorption spectroscopy (AA) showed greater than 95% of the copper (II) ions originally in the 500 mL solution described above was in the 25 mL recovery solution.

EXAMPLE 5

The experiment of Example 3 was repeated with 10 g of the silica-bound sulfur and nitrogen-containing hydrocarbon of Example 2. A 100 mL solution of 10 ppm Au (I) in 0.01M KCN was passed through the column. A 10 mL aqueous solution of 5M KCN was then passed through the column. Analysis of the recovery solution by AA showed that about 90% of the Au (I) ions originally present in the 100 mL Au (I) solution was found in the 10 mL recovery solution.

EXAMPLE 6

In this example, 2 g of the silica gel bonded phosphorus and nitrogen containing hydrocarbon of Example 3 was placed in a column. A 25 mL solution containing approximately 1000 ppm palladium ions in 5M nitric acid was passed through the column. A 25 mL aqueous stripping solution of 1M thiourea and 0.1M acetic acid was then passed through the column. Analysis of the recovered stripping solution by both atomic absorption spectroscopy (AA) and inductively coupled plasma spectroscopy (ICP) showed that over 90% of the palladium in the original loading solution was recovered in the stripping solution.

From the foregoing, it will be appreciated that the sulfur and nitrogen containing hydrocarbon ligands of formula (1) bonded to a solid support in accordance with the present invention provide a material useful for the separation and concentration of the noble metal cations from mixtures of those cations with other metal cations and also in the presence of strong acids or strong complexing agents. The noble metals can then be recovered from the concentrated recovery solution by standard techniques known in the science of these materials. In the absence of noble metal ions, other transition metal ions may be selectively recovered.

Although the invention has been described and illustrated by reference to certain sulfur and nitrogen containing hydrocarbon ligands of formula (1) and the process of using them, analogs of these sulfur and nitrogen containing hydrocarbon ligands are within the scope of the compounds and processes of the invention as defined in the following claims.

We claim:

1. A compound of the formula

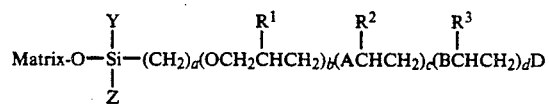

wherein A and B are members independently selected from the group consisting of N(R), N(R)CH$_2$, O, OCH$_2$, S and SCH$_2$; R is a member selected from the group consisting of H, lower alkyl, aryl and [(CH$_2$)$_f$E]$_g$R$^4$; D is a member selected from the group consisting of H, SH, OH, NH(R), lower alkyl and N(R)[CH$_2$CHR$^1$CH$_2$O]$_b$(CH$_2$)$_a$SiXYZ; X, Y and Z are members independently selected from the group consisting of Cl, O-matrix, OCH$_3$, OC$_2$H$_5$, methyl, ethyl and halogenated substituents thereof; R$^1$, R$^2$ and R$^3$ are members independently selected from the group consisting of H, SH, OH, lower alkyl, aryl, dialkylphosphino, diarylphosphino, dialkylarsino, diarylarsino and [(CH$_2$)$_f$E]$_g$R$^4$; E is selected from the group consisting of S, Se and Te; R$^4$ is a member selected from the group consisting of H, lower alkyl and aryl; a is an integer from 2 to about 10; b is an integer of 0 or 1; c is an integer from 1 to about 2000; d is an integer from 0 to about 2000; f is an integer from 2 to about 10; g is an integer from 1 to about 20; matrix is selected from the group consisting of sand, silica gel, glass, glass fibers, alumina, zirconia, titania and nickel oxide; with the following provisos: (1) if A is selected from the group consisting of O, OCH$_2$, S and SCH$_2$, then B must be selected from the group consisting of N(R) and N(R)CH$_2$, (2) that at least one of the groups R, R$^1$, R$^2$ and R$^3$ must be present in the compound as a member independently selected from the group consisting of SH, dialkylphosphino, diarylphosphino, dialkylarsino, diarylarsino and [(CH$_2$)$_f$E]$_g$R$^4$, and (3) d can be the integer 0 only if A is selected from the group consisting of N(R) and N(R)CH$_2$.

2. A compound as defined in claim 1, wherein R$^1$ is OH.

3. A compound as defined in claim 1, wherein a is 3, b is 1, c is 1, d is 1, R$^1$ is OH, R$^2$ and R$^3$ are both H, A is N(R), B is NH and D is SH.

4. A compound as defined in claim 1, wherein a is 3, b is 1, c is 1, d is 0, R$^1$ is OH, R$^2$ and R$^3$ are both H, A contains nitrogen, d is 0, and D is

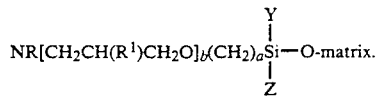

5. A compound as defined in claim 1, wherein a is 3, b is 1, c is 4, d is 1, R$^1$ is OH, R$^2$ and R$^3$ are both H, A contains nitrogen, B contains nitrogen,

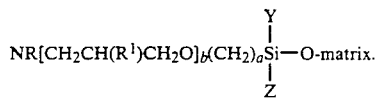

6. A compound as defined in claim 1, wherein X, Y and Z are (O-matrix).

* * * * *